(12) United States Patent
Dunn et al.

(10) Patent No.: US 9,594,739 B2
(45) Date of Patent: Mar. 14, 2017

(54) DOCUMENT SIGNING SYSTEMS AND METHODS

(75) Inventors: Cary Dunn, Santa Barbara, CA (US); Jonathan Siegel, Santa Barbara, CA (US); Daryl Bernstein, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 519 days.

(21) Appl. No.: 12/908,827

(22) Filed: Oct. 20, 2010

(65) Prior Publication Data

US 2011/0093777 A1    Apr. 21, 2011

Related U.S. Application Data

(60) Provisional application No. 61/253,778, filed on Oct. 21, 2009.

(51) Int. Cl.
| | | |
|---|---|---|
| *G06F 17/00* | (2006.01) | |
| *G06F 17/24* | (2006.01) | |
| *G06F 17/22* | (2006.01) | |
| *G06Q 10/10* | (2012.01) | |

(52) U.S. Cl.
CPC ........ *G06F 17/243* (2013.01); *G06F 17/2247* (2013.01); *G06F 17/242* (2013.01); *G06Q 10/10* (2013.01)

(58) Field of Classification Search
CPC .................................................. G06F 17/242
See application file for complete search history.

(56) References Cited

U.S. PATENT DOCUMENTS

| | | | |
|---|---|---|---|
| 6,091,835 A * | 7/2000 | Smithies et al. .............. 382/115 |
| 7,933,835 B2 * | 4/2011 | Keane ..................... G06Q 20/02 235/379 |
| 7,934,098 B1 * | 4/2011 | Hahn et al. ................... 713/176 |
| 2003/0080948 A1 * | 5/2003 | Lapstun ............... B41J 2/17503 345/173 |
| 2003/0093757 A1 * | 5/2003 | Silverbrook ......... B41J 2/17503 715/230 |
| 2003/0154406 A1 * | 8/2003 | Honarvar ............... G06Q 10/10 726/10 |

(Continued)

OTHER PUBLICATIONS

EchoSign, "Electronic Signature Solution", 4 pages, http://www.echosign.com/ public/static/solutions.jsp, retrieved on Mar. 20, 2012.*

*Primary Examiner* — Laurie Ries
(74) *Attorney, Agent, or Firm* — BainwoodHuang

(57) ABSTRACT

A system and method for enabling electronic signing of an unsigned electronic document over the internet or similar network. Responsive to receipt of document and signer information from a document sender, a document execution server makes available to all signer users over a network, the unsigned electronic document, together with signature fields in the document. The document execution server receives over the network, from one or more of the signer users, signature data representative of signer user signatures associated with the respective signature fields of the unsigned electronic document. Responsive to receipt of the signature data from one or more of the signer users, the document execution server generates a signed electronic document corresponding to the unsigned electronic document.

19 Claims, 22 Drawing Sheets

(56) References Cited

U.S. PATENT DOCUMENTS

| | | | |
|---|---|---|---|
| 2004/0195310 A1* | 10/2004 | Silverbrook | G06F 3/014 235/375 |
| 2006/0136731 A1* | 6/2006 | Hicks et al. | 713/176 |
| 2007/0192275 A1* | 8/2007 | Foygel et al. | 707/1 |
| 2007/0198533 A1* | 8/2007 | Foygel et al. | 707/10 |
| 2008/0209313 A1* | 8/2008 | Gonser | 715/255 |
| 2009/0024912 A1* | 1/2009 | McCabe et al. | 715/224 |
| 2009/0254971 A1* | 10/2009 | Herz | G06Q 10/10 726/1 |
| 2010/0106973 A1* | 4/2010 | Guenther | 713/176 |
| 2011/0072502 A1* | 3/2011 | Song | G06Q 10/10 726/9 |
| 2011/0179289 A1* | 7/2011 | Guenther | 713/189 |

\* cited by examiner

DOCUMENT SIGNING SYSTEMS AND METHODS

REFERENCE TO RELATED APPLICATIONS

This application is related to U.S. provisional patent application Ser. No. 61/253,778, filed Oct. 21, 2009, entitled "Improved Systems and Methods for Document Signing"; U.S. patent application Ser. No. 12/908,840, filed Oct. 20, 2010 and entitled "Computer Form Action Zone Summary System and Method"; and U.S. patent application Ser. No. 12/908,847, filed Oct. 20, 2010 and entitled "Form Completion Rate Enhancement System and Method", all of which are fully incorporated by reference herein.

FIELD

The present system and method relates to electronic commerce and, more specifically, to systems and methods for enabling users to execute electronic documents using biometric signatures.

BACKGROUND

Businesses and individuals rely on legally executed documents in a variety of contexts, from completion of complex forms used by governments and institutions (e.g., insurance forms, car loan and purchase forms, and the like), to simple contracts between individuals (e.g., lease agreements, wills, and a host of miscellaneous arrangements), with a range of contracts in between.

Documents signed by overnight envelope take a minimum of one day to reach the recipient and an additional day to be returned. Due to intra-office distribution delays and recipients' tendency to put paper documents in to-do piles, the average cycle time using overnight envelopes is 5-7 days. Documents signed by fax have an average cycle time of 2-3 days, due to intra-office delays, procrastination of paper document tasks, and fax machine mishaps. Faced with the burden of signing a paper document and returning it by fax, scan, or mail, many recipients put it down on their desk and forget about it.

While simply typing the signer's name fulfills the legal requirement for an online agreement, users find a "real" signature more assuring, and often third parties only accept documents signed by what appears to be a "real" signature, i.e., one that looks as though an individual put pen-to-paper to apply a personal signature. For online document signing, the presence of a handmade mark provides an extra level of authentication.

Some applications that allow documents to be signed online include typed signature, i.e., a series of typed letters and/or characters qualifies as a unique signer identifier. Others allow users to use an electronic pen on a separate pad piece of hardware, to store an on-site signature, which signature then is correlated with a site-specific activity, i.e., signing for a credit card at the check-out stand of a retail establishment. While graphics packages exist that allow users to create freestyle designs that are translated from a mouse or other peripheral device, for purposes of developing creative works, these typically are crude in effect, and do not exactly mimic the weight, velocity, and other metrics that are associated with a unique user signature.

Thus, there remains a need for a method and system for creating biometric signatures that have a high degree of specificity and correlation with the physical signing movements of a user. There also remains a need for having an integrated system that associates such a biometric signature with one or more documents to be signed and electronically transmitted over the internet for effective online document signing events.

In addition, users are increasingly turning to exchanging executed documents online These documents not only include a field for including a signature, such as the type described above, but may also include additional fields that may require the signer to initial, sign, or take some other action. However, in a large document, signers may easily lose track of how many such fields they are required to complete (i.e., sign, initial, fill with data), and how many they already have completed. Thus, when users of an online document exchange program encounter problems, such as a signer not completing a document, or a signer not understanding what actions are required, they turn to customer support. This not only slows down the completion progress of a signing event, but also increases the load on customer support. Thus, there remains a need for a system that identifies the fields that require signer action.

SUMMARY

The present system and method is directed to enabling electronic signing of an unsigned electronic document over the internet or similar network. Generally, an unsigned electronic document includes content displayable to a signer user as text and/or graphics on one or more pages, and one or more signature fields at one or more locations on the pages, wherein the signature fields are adapted to receive a signature of a signer user.

A document execution server is configured to receive over the network from a document sender, the unsigned electronic document together with signer party data representative of the identities of one or more signer users who are to sign the unsigned electronic document. The server makes available to all signer users over the network, the unsigned electronic document, together with an online signature entry pad associated with each signature field in the unsigned electronic document. The document execution server receives over the network, from one or more of the signer users, signature data representative of one or more biometric actions by the respective signer users corresponding to entry of signer user signatures to the signature entry pads associated with the respective signature fields of the unsigned electronic document. In response to receipt of the signature data from one or more of the signer users, the document execution server generates a signed electronic document corresponding to the unsigned electronic document, wherein the signed electronic document includes information representative of the signatures of the signer users, and wherein the signed electronic document is displayable to signer users with the text and/or graphic content and signature fields of the unsigned electronic document and a graphical representation of the received signature data in the respective signature fields.

Although the term "signature field" is used herein, it includes entry fields for information or data other than signatures, such as signer name, signer initials, addresses, or any other information that may be requested by the document sender. The term "signature" may include any biometric action by the signer user, such as: freehand motion using a mouse, electronic pen, touch-screen, or any other method for detecting and recording (either temporarily or in a stored location) graphics unique to the signer user; iris or other eye scan; fingerprint(s); vocal sound; or other biometrics as may be available.

In an alternative embodiment, the document execution server establishes the received unsigned electronic document to be web-ready. The document sender may be a signer user, or the document sender is other than a signer user.

In another embodiment, the document execution server generates authentication data associated with the received signature data from the respective signer users, wherein the authentication data is substantially not changeable by any party. The document execution server may store the authentication data in association with the signed electronic document. The document execution server may also substantially irreversibly couple the authentication data with the signed electronic document. The document server may also send copies of the signed electronic document to the signer users.

In alternative embodiments, the document execution server may, prior to sending the unsigned document to the signer users, modify the unsigned document to include flag data interpretable by the respective signer users to successively identify to the respective signer users the signature fields in the unsigned electronic document which require the entry of their signature or other action in the associated signature entry pads. This modified unsigned electronic document, containing such flags, may then be made available to the respective signer users for signing or other required action.

Alternatively, the document execution server, in conjunction with sending the unsigned document to the signer users, may generate for each signer user, summary data interpretable by each signer user to identify the locations in the unsigned electronic document requiring signature or other action by the respective signer users, and sending the summary data to the respective signer users.

As used herein, graphical representation of the received signature data in the respective signature data fields of the signed electronic document for the signer users may substantially match the signatures of the respective signer users. Further, the signer party data representative of identities the signer users may include email addresses, IP addresses, SMS addresses, or other electronic forms of address or identification, for one or more of the signer users. Alternatively, the signer party data representative of identities the signer users may include fax numbers for one or more of the signer users. A biometric action may correspond to a free-form signature, retina scan, iris scan, or fingerprint effected by a signer user.

BRIEF DESCRIPTION OF FIGURES

FIG. 5B is a screenshot of an unsigned electronic document having a flag, as used in an embodiment of the present system and method.

DETAILED DESCRIPTION

Figure 1:
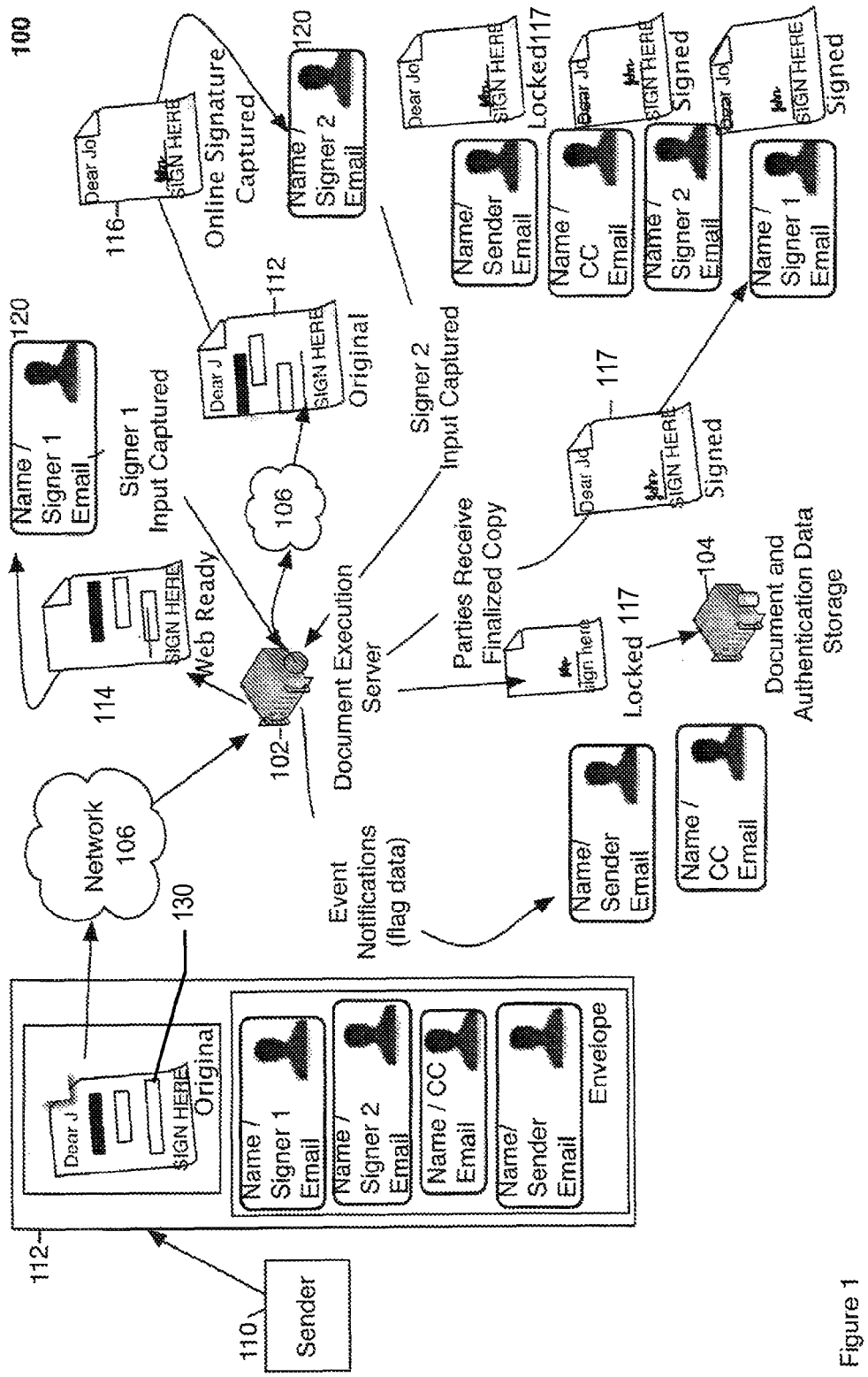
FIG. 1 shows a system chart of an embodiment of the present system.

The present system and method is directed to enabling electronic signing of an unsigned electronic document over the internet or similar network. As shown in FIG. 1, the present system 100 includes a document execution server (DES) 102 in communication with a document and authentication data storage device 104. The document execution server 102 is configured to receive over a network 106 from a document sender 110 an unsigned electronic document 112 that contains one or more signature fields 130 , and data representative of the identities of signer users (who are to sign the electronic document) and parties to be copied. The document execution server 102 sends the unsigned electronic document 112 to one or more signer users 120, identified by the document sender 110. Once each target signer user 120 completes all designated signature fields for that signer user, the document execution server 102 converts the original unsigned electronic document 112 into a (partially) signed electronic document 116. Once all target signer users 120 have completed all designated signature fields, the input is combined to generate a completed signed electronic document 117. The completed signed electronic document 117 may be logged and stored in the document and authentication data storage device 104 for future use. The signed electronic document is made available, either at the time of completion or at a later date, to each of the signer users and the copied parties. In an alternative embodiment, partial progress on an unsigned electronic document is saved by the signer user 120 prior to that signer user completing the document.

The document execution server 102 sends notifications to the document sender as well as user signers, indicating the progress of the signing activity. For example, the notifications may identify fields in the electronic document still requiring entry of data by one or more of the signer users.

Figure 2:
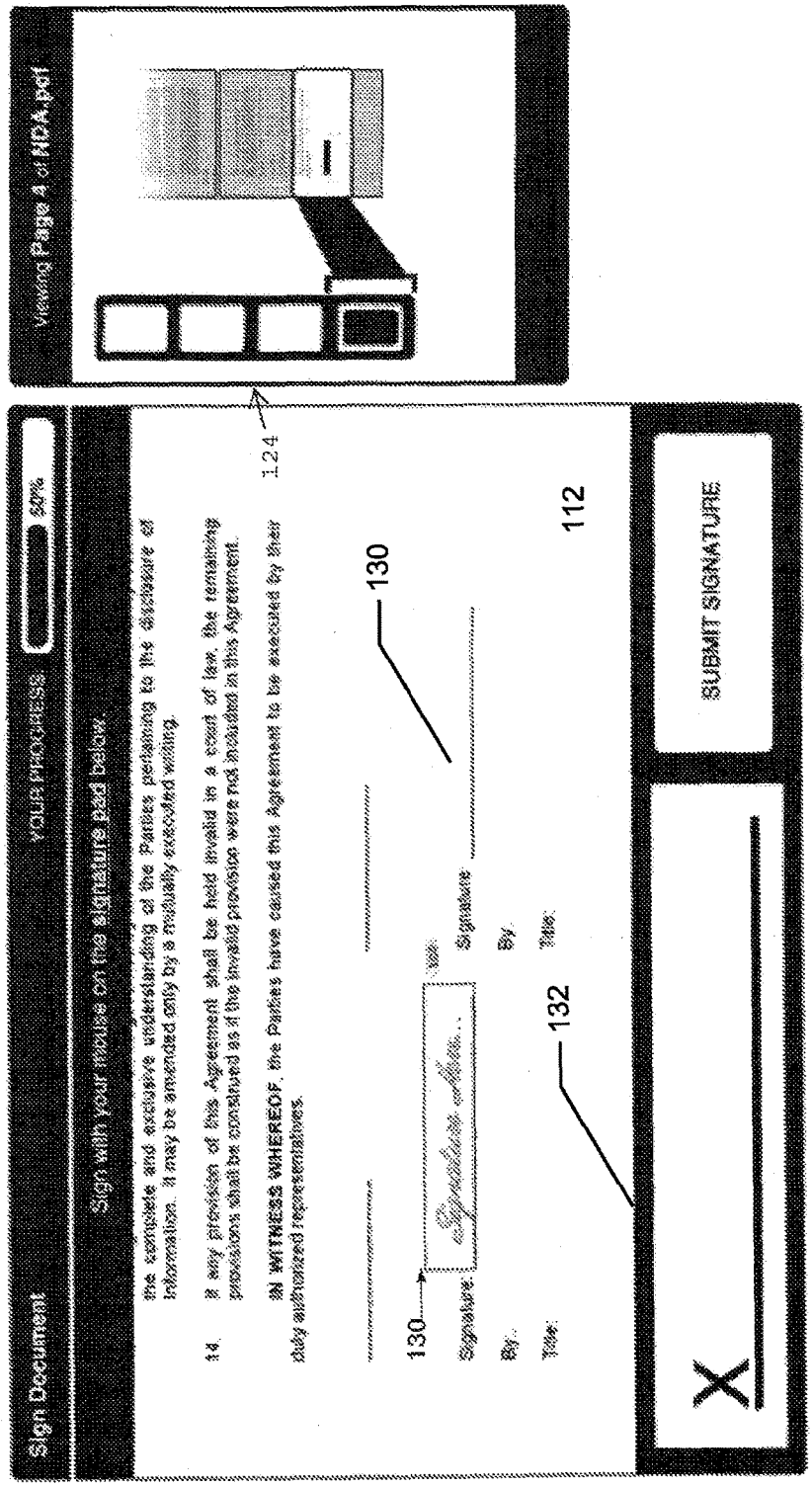
FIG. 2 is a screen shot of an unsigned electronic document as used in an embodiment of the present system and method.

FIG. 2 shows an example of an unsigned electronic document 112 having multiple signature fields 130. The unsigned electronic document 112 includes content displayable to a signer user 120 as text, graphics, or a combination of text and graphics. The unsigned electronic document 112 includes one or more signature fields 130, into which data is entered by signer users 120 at one or more locations on the pages of the electronic document 112 using online signature entry pads 132 associated with each signature entry field 130, as described in further detail below. The location, type, and number of signature fields 130 per document are specified by the document sender 110 to the document execution server 102. The document execution server 102 associates the signature fields 130 identified by the document sender 110, and presents the unsigned electronic document 112, including all signature fields 130, to the respective signer users 120 identified by the document sender 110. At the right side of FIG. 2, the progress in signing (or otherwise completing the signature fields for a signer user) is indicated by an information summary indicator 124, which is shown in this FIG. 2 as a "thermometer-type" graphic. In FIG. 2, the electronic document 112 is shown for a Chief Executive Officer signer user, displaying a signature field 130.

In an alternative embodiment, the document execution server 102 converts the original unsigned electronic document 112 into an unsigned web-ready document 114 (shown in FIG. 1) having the same information and signature fields 130 as the original document. Unsigned web-ready documents are ready for dynamic entry of information into the signature fields 130 by one or more signer users 120. This web-ready conversion of the original documents may be achieved using standard conversion software and algorithms readily available and known to those skilled in the relevant art. For example, a Microsoft Word Document can be opened in the OpenOffice Application, exported as a PDF and then, using pdf2swf from SWFTOOLS.org, exported in Flash format, which readily is displayable in most generally commercially available web browsers. In an alternative embodiment, the unsigned electronic document 112 is exported using similar tools into PNG files, which are supported by commercially available web browsers, and which technology is available in services such as DOC-STOC.com and SCRIBD.com.

After receiving the original unsigned electronic document 112 and, as applicable, converting the document to an unsigned web-ready document 114, the document execution server 102 makes available, via a network, either the original, unsigned electronic document 112 or the unsigned web-ready document 114 to a signer user 120, together with an online signature entry pad 132 associated with each signature field 130 in the unsigned electronic document 112. In an embodiment, the document execution server 102 makes the unsigned electronic document 112 available to multiple signer users 120, either simultaneously or serially, depending on instructions from the document sender 110, or other external, predetermined parameters and input. In an alternative embodiment, the document execution server 102 delivers the unsigned electronic document 112 via an application programming interface (API) for access by predetermined signer users.

In response to receipt of the signature data from one or more of the signer users 120, the document execution server 102 generates a signed electronic document 116 corresponding to the unsigned electronic document 112 and including the signature data.

In an embodiment, the signed electronic document 116 then is made available by the document execution server 102 to all or a predetermined subset of the signer users 120 and to the document sender 110 for verification, confirmation, and other predetermined actions. In an embodiment, the document execution server 102 transmits the signed electronic document 117 (in a "locked" form) to a document and authentication data storage device 104. This may be achieved, for example, by using common PKI signing techniques to generate a one-way hash of the document that only could be generated from that specific "locked" document and only by an entity, such as the document execution server 102, with access to the PKI credentials. This hash fingerprint may then be stored in the authentication storage device 104 or, alternatively, embedded back into the locked document in a process analogous to existing PDF signing standards.

As used herein, a signer user 120 may be the document sender or one or more third parties. In addition, the term "signature field", as used herein, includes entry fields for information or data that may include signatures, signer name, unique signer identifiers, signature initials, addresses, or any other information that a document sender may identify as being acceptable forms information for a particular signature field. For example, in one real estate transaction document, one signature field type may require entry of the signer user's full, legal name, another signature field type may require entry of the target real property address, another signature field type may include date data, and such.

The term "signature" includes any biometric action by a signer user, such as: freehand motion using a mouse, electronic pen, touch-screen, or any other method for detecting and recording (either temporarily or in a stored location) graphics unique or capable of being associated with a particular signer user. It also includes iris or other eye scan data, fingerprints, vocal sound or voiceprints, or other available biometrics. The freehand motion may either approximate, electronically, the signer user's traditional signature (i.e., as performed with a pen or pencil on paper), or may be a graphic that is quite dissimilar from the signer user's traditional signature. The freehand motion may include the velocity and timing of the user's movements, in addition to or distinct from the resultant graphic image.

Figure 3A:
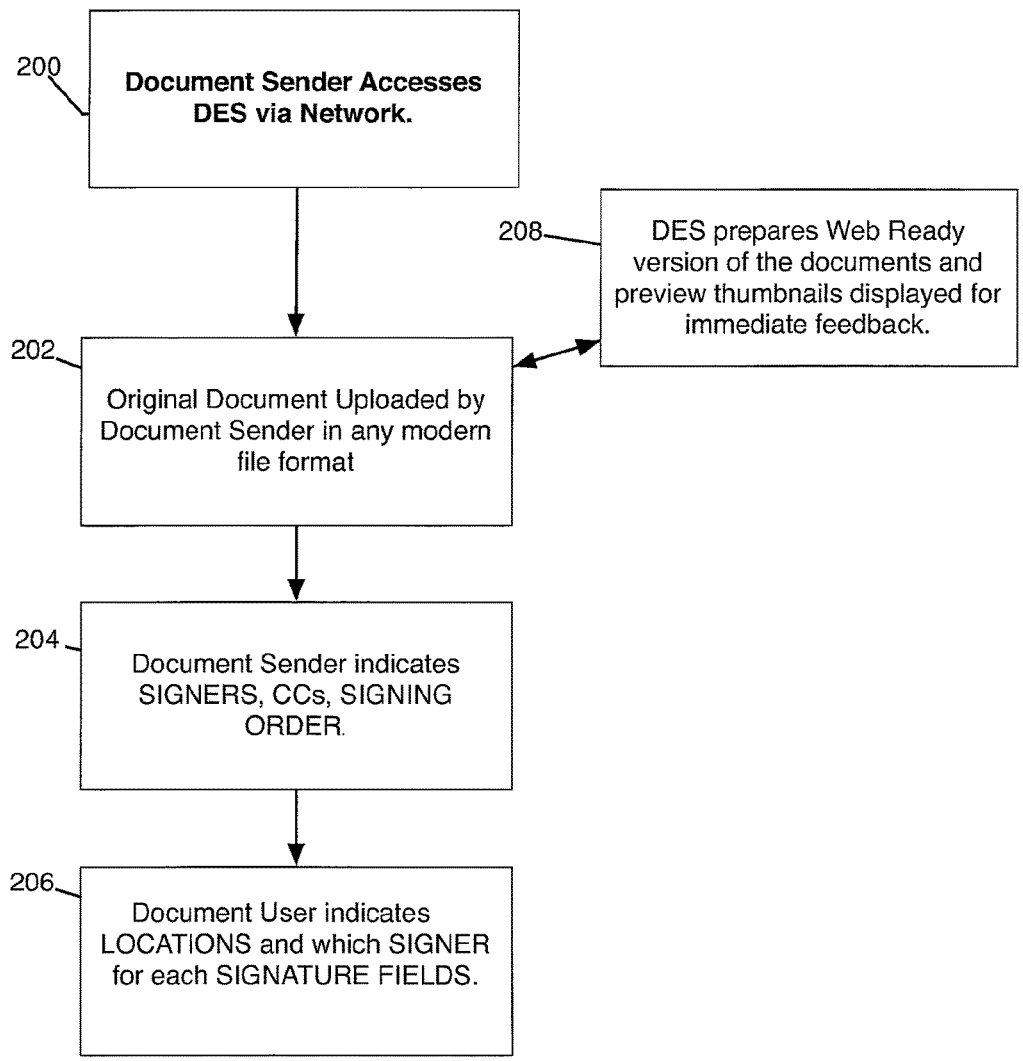
FIGS. 3A-3C are a flowchart of an embodiment of the present method.

The flowchart of FIG. 3A further illustrates an embodiment of the present method. As shown, a document sender accesses 200 the document execution server (DES) 102 via a network, such as the internet. The document sender then uploads 202 the original electronic document to the document execution server. The document sender then indicates 204 the name and contact information of each signer user, each entity that will receive a copy of either the unsigned electronic document and/or the signed electronic document, and any order in which the signature fields contained in the subject document are to be completed by the designated signer users. The document sender also indicates 206 at this time, the locations of signature fields within the unsigned electronic document, together with instructions regarding which signer user is required to complete which corresponding signature field. With multiple signer users, different signer users generally are required to complete different signature fields, as well as different signature field types. For example, in a real estate transaction, the buyer may be required to provide a signature, a personal address, and a date, whereas an escrow agent may be required to provide a signature, a license number, and financial information.

As shown in FIG. 3A, in an embodiment, the document execution server prepares 208 a web-ready version of the original document. The document execution server also may generate thumbnail displays, flags, or other indicia, associated with the various signature fields for easier review by the signer user and a more expedient signer user completion of the designated signature fields.

Figure 3B:
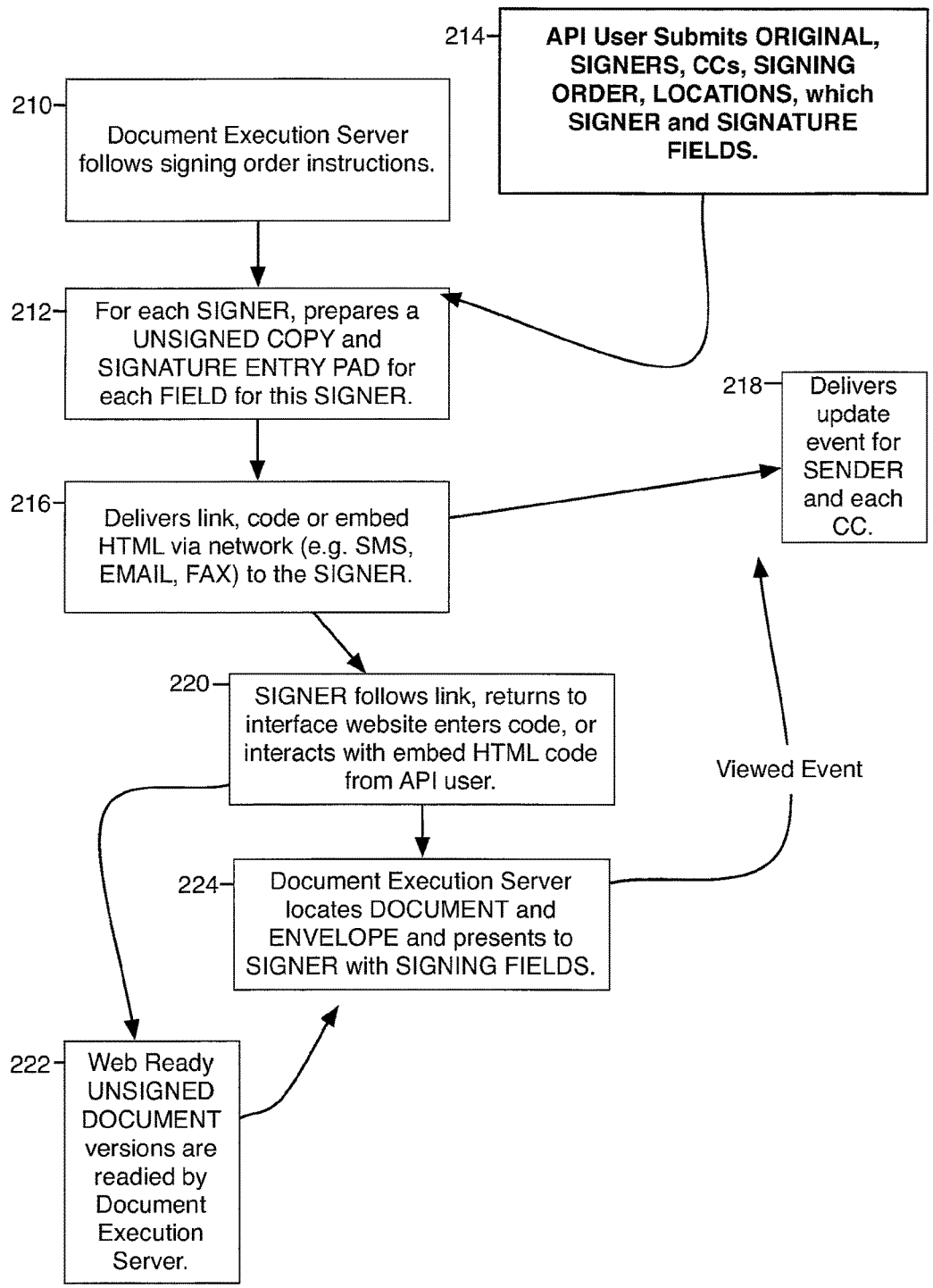

Turning to FIG. 3B, once the document execution server receives the original document, together with the additional document information from the document sender, the document execution server follows 210 the signing order instructions sent by the document sender. For each designated signer user, the document execution server in effect prepares 212 an unsigned electronic document associated with the original document, and a signature entry pad for each signature field. All such information regarding the signer user and instructions related to the document, are collectively referred to the "envelope" of the electronic document. Additional envelope information may include data associated with the identity of the signer user, such as email address, IP address, SMS address, facsimile number, or other electronic forms of address or identification. This envelope is integrally associated with the original document and, as such, remains part of the associated electronic and web-ready versions of the same document as such are generated by the document executive server.

In an alternative embodiment, an API user, such as another internet-based device, is the document sender, which submits 214 the original document, and the associated signer user, copied users, signing order, signature field locations, and signature field authorizations to the document execution server. In an embodiment, the API user receives delivery of the unsigned web-ready documents on behalf of the designated signer users.

Once the unsigned electronic document is prepared, the document execution server delivers 216 an internet link, code, or embedded HTML via a network to the designated signer users. The network may include SMS, email, facsimile, and other available technologies for distributing data. At a proximal time that the document execution server in effect transmits the unsigned electronic document to the signer users, the document execution server may deliver updates 218 of the event to the document sender and other designated entities to be copied on such transmission. In this manner, the document sender can begin to track the progress of the document as the designated signer users complete the signature events.

Once the link, code, embedded HTML, or other contact is made by the document execution server to a signer user, that signer user then accesses 220 the unsigned electronic document by following such link, returning to the website interface for the document execution server, interacts with the embedded HTML code from the API user, or otherwise opens the unsigned electronic document. The document execution server locates 224 the unsigned electronic document, together with its associated envelope information, and presents the same to each signer user.

In some embodiments, web ready unsigned document versions are readied 222 by the document execution server.

Figure 3C:
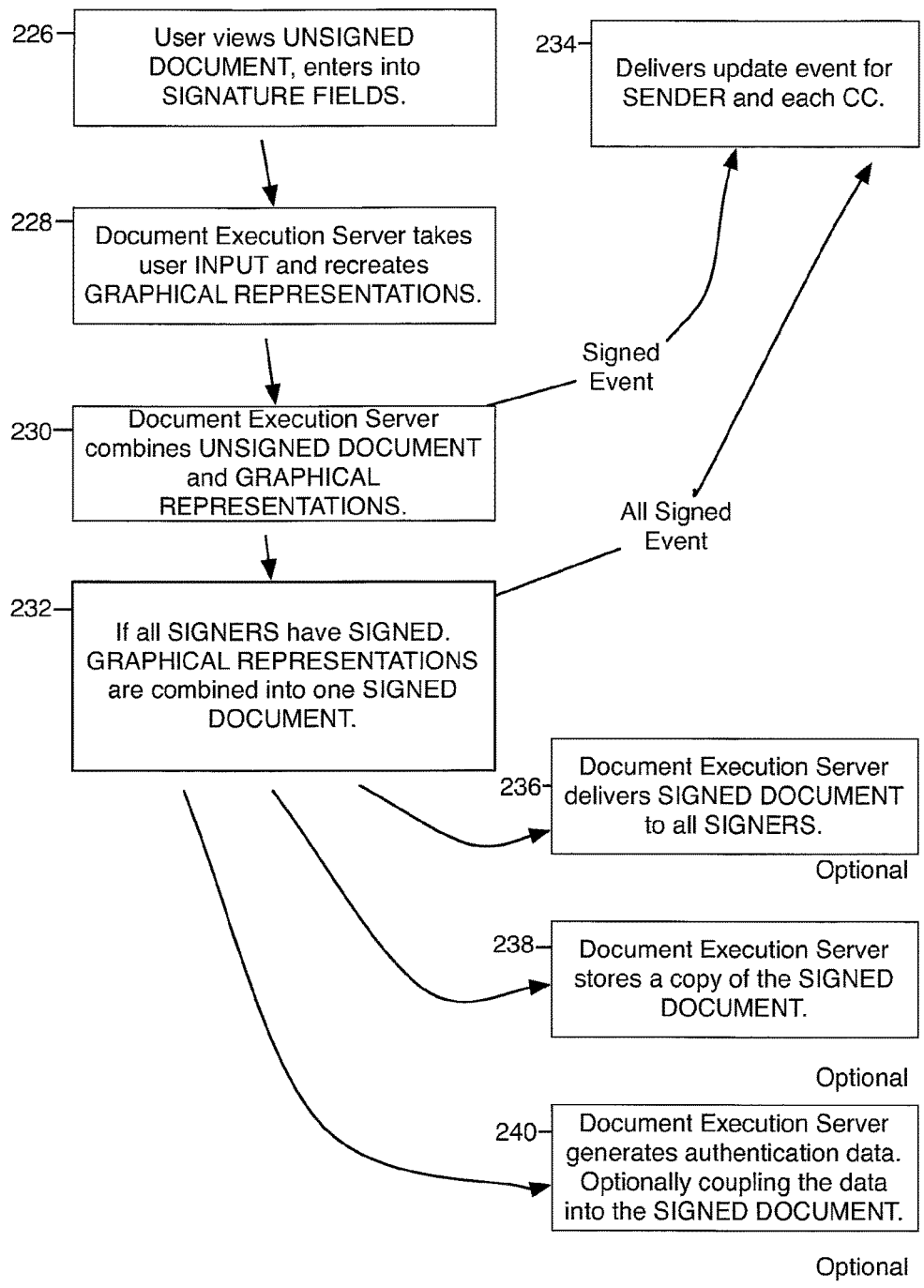

As continued in FIG. 3C, the signer user views 226 the unsigned electronic document, and enters the information requested in each of the signer user's respective signature fields. Information is entered into the signature field by the dynamic online signature entry pad associated with each signature field. Signature entry pads are dynamic fields that appear on the GUI to facilitate signer user entry of information required for the associated signature field. Such information may be entered using a touch pad, mouse, touch-screen, voice entry, and other technologies generally commercially available.

Upon receipt of the entered information, the document execution server creates 228 a graphical representation of the signature field input received from the signer user. The document execution server then (or at desired times) in effect combines 230 the graphical representations with the unsigned electronic document to generate a signed electronic document, to define a signed event. In parallel with receiving the signature field input from the signer users, and with generating each signed electronic document, the document execution server delivers 234 updates on the progress of the signing events to those entities identified as "cc", or copied entities, as well as to the document sender. Once all signers have completed signing the document, all graphical representations of all signature field input received from all signers is combined 232 into a single signed document.

In alternate embodiments, and as shown in FIG. 3C, the document execution server then may deliver 236 a copy of the signed electronic document to each of the designated, or selected ones of the signer users associated with that document. In an embodiment, the document execution server optionally locks and stores 238 a copy of the signed electronic document, or may send a copy to a document and authentication data storage device for storage. In an embodiment, the document execution server generates 240 authentication data associated with the signed electronic document. Such authentication data may be data incorporated into the signed electronic document, it may be part of the document envelope, or may be some additional data used only for authentication purposes.

Figure 4:
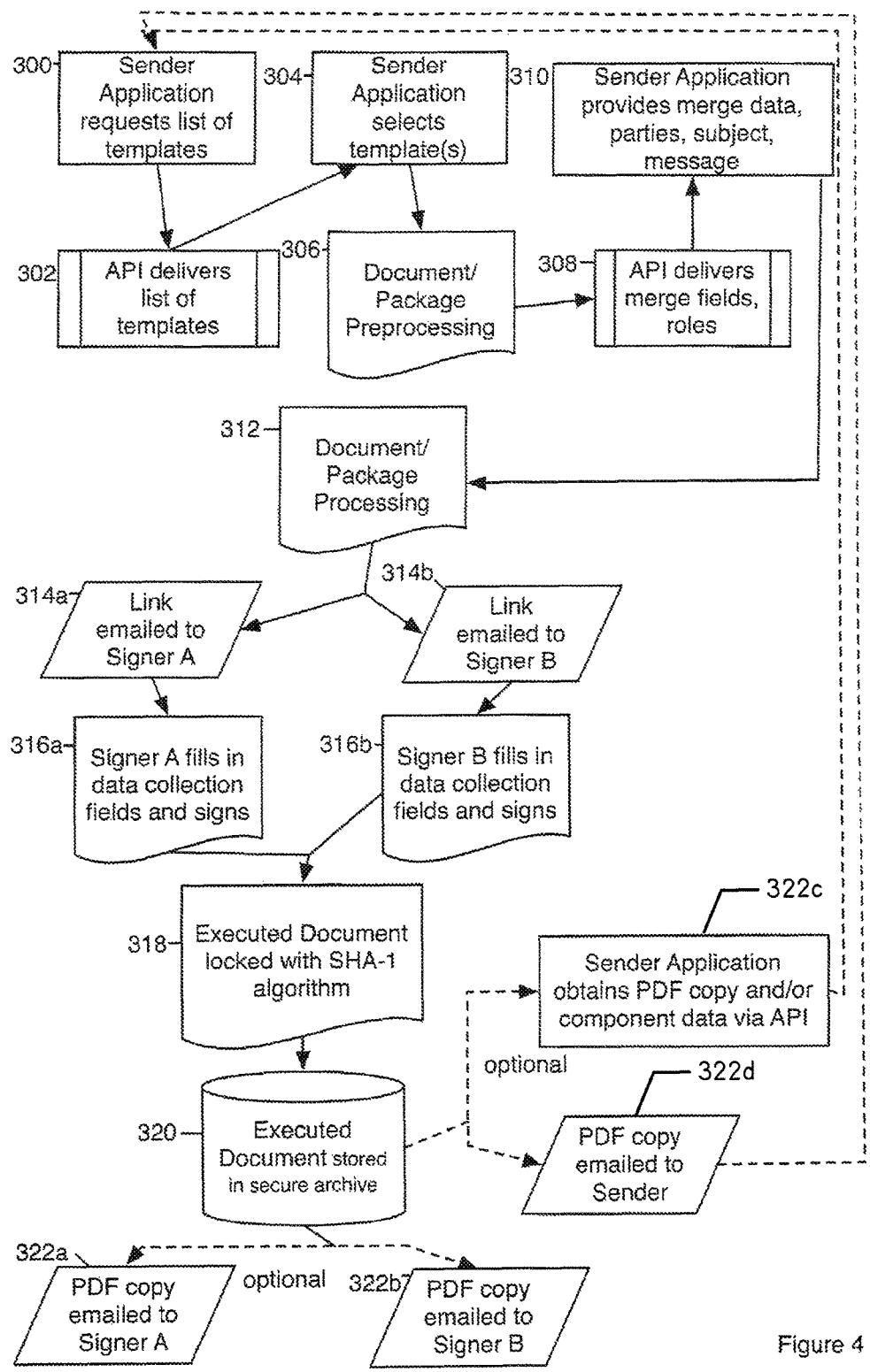
FIG. 4 is a flowchart of an embodiment of the present method.

In an alternative embodiment of the present method, predetermined template documents are created by third party entities, or the administrator of the present method, and stored in the document execution server for use by customer/ document senders via API. In such an embodiment, as shown in FIG. 4, a document sender, or an application used by a document sender, requests 300 a list of template electronic documents. Such template documents have predetermined signature fields, which are not generally changed or changeable by the document sender. An example of such an embodiment would be form lease agreements, or other standard forms.

Upon receiving the request, the document execution server delivers 302 via API, a list of available templates to the sender user. The sender user application selects 304 a template. Upon receipt of the sender user template choice 304, the document execution server performs document package pre-process 306. This pre-process generates a document ID associated with the template. It is possible that many document ID's are associated with each template, and each unique document (having an assigned unique document ID) likely will have a unique envelope. The API then delivers 308 the merge fields and roles associated with the envelope for the designated template. The sender user application provides 310 merge data, information relating to the signer users, and other information and data required for the designated template. In this example, the template is the unsigned electronic document identified and discussed above. The document execution server processes 312 the unsigned template document, in a manner similar to that described above, and sends links 314*a*, 314*b* via email to each designated signer user. Each designated signer user provides 316*a*, 316*b* the information required for each signature field. Upon receipt of all signature field data, such data is incorporated into an unsigned template document, and the document execution server locks 318 the resulting signed electronic document, as described in further detail above.

At that point, the signed electronic document may be stored 320 in a document and authentication data storage device, and copies of the signed electronic document sent 322*a*, 322*b* to designated signer users, the document sender, and others as designated by the document sender.

In some embodiments, the sender application obtains 322*c* a PDF copy and/or component data via API. And in some embodiments, a PDF copy is emailed 322*d* to the sender.

In alternate embodiments, sender users may select a template unsigned electronic document from a website, from the user's own library, or from secondary sources. Alternatively the step of processing the document 312 may be followed by an API delivery of embedded signing codes. In an alternative embodiment, all communications between the document sender and the document execution server, or between the document execution server and one or more of the designated signer users, may be via email, facsimile, SMS, and other electronic communications methods generally available.

Figure 5A:
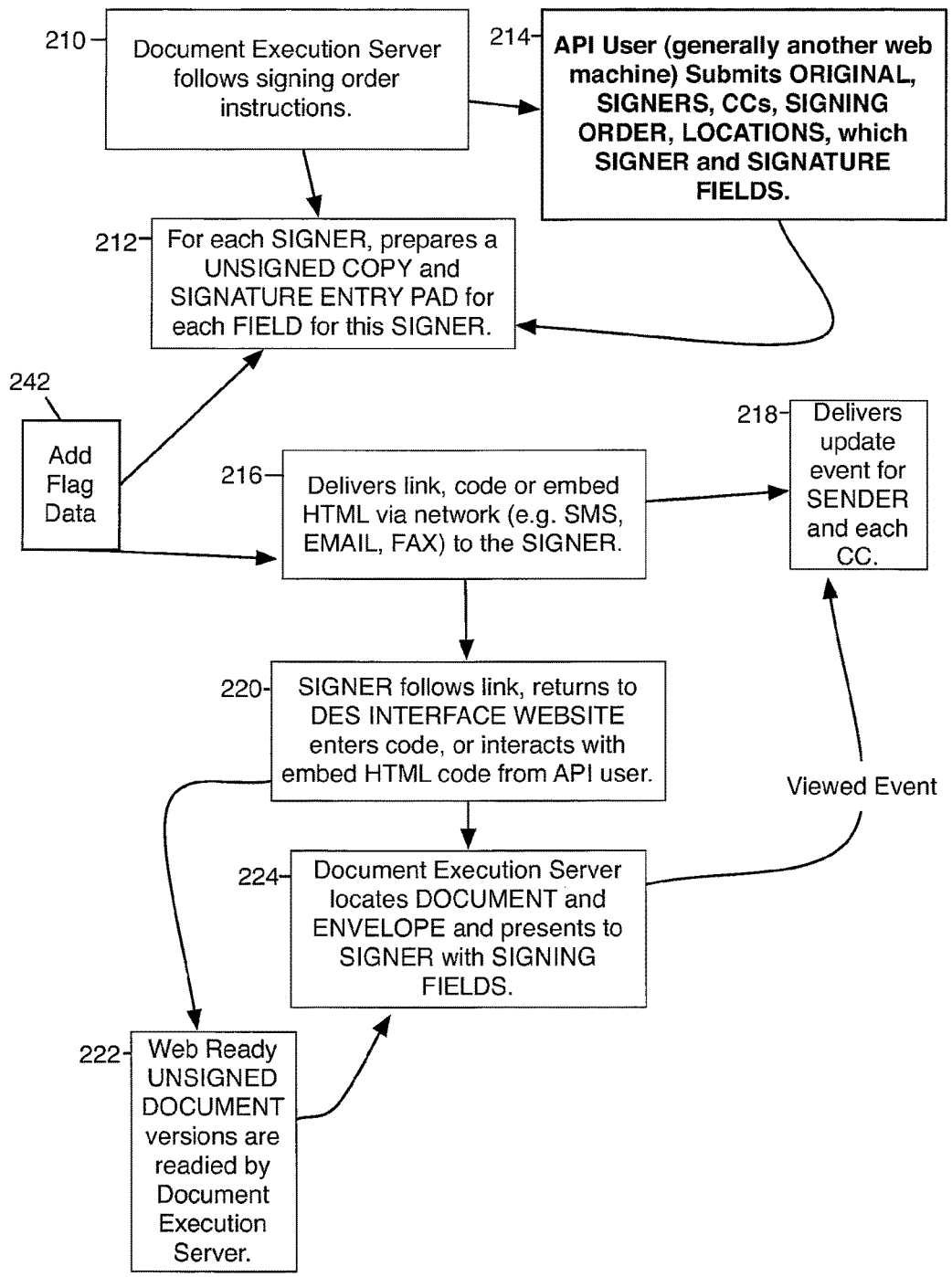
FIG. 5A is a flowchart of an embodiment of the present method.
Figure 5B:
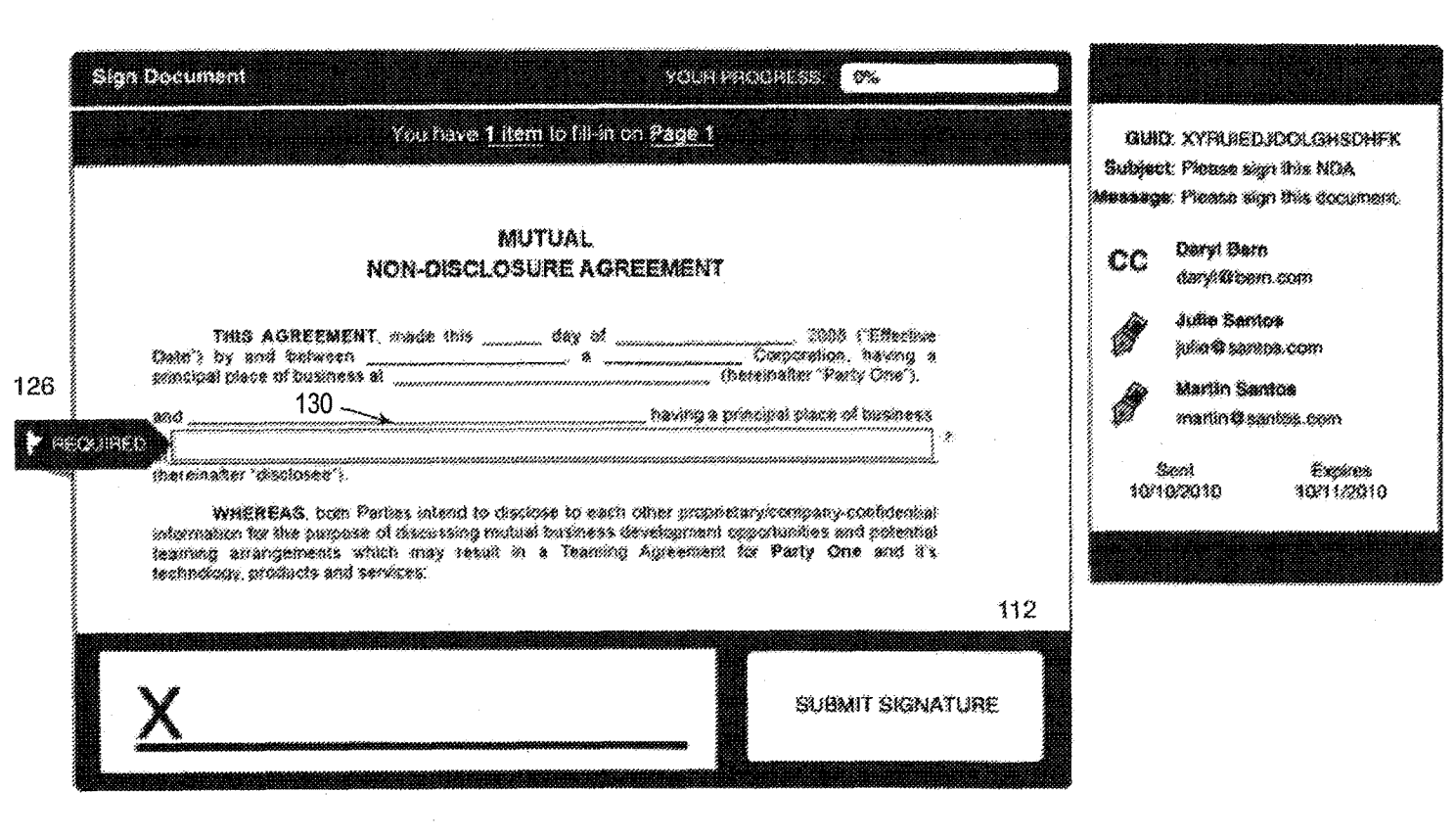

In an alternative embodiment, as shown in FIG. 5A, the document execution server may, prior to delivering 216 the unsigned electronic document to the signer user, modify 242 the unsigned electronic document to include flag data to successively identify to each respective signer user the signature fields in that unsigned electronic document which required data entry. The flag data is associated with visual "flags" 126 (as shown in FIG. 5*b*) may be some visual insignia, such as a colored arrow, or any other indicator noticeable by the signer user and generally recognizable by signer users as a flag 126 that requires attention. The flags 126 may be static within the unsigned document, i.e., one flag is visually affixed adjacent each signature field. Alternatively, the flags 126 may be dynamic, such that once a signature field is completed, the flag changes, for example, it disappears, changes colors, moves, and the like. This flag data typically is removed when the document execution server combines 230 the unsigned document and graphical representations of signature field data to create the signed electronic document.

Figure 6:
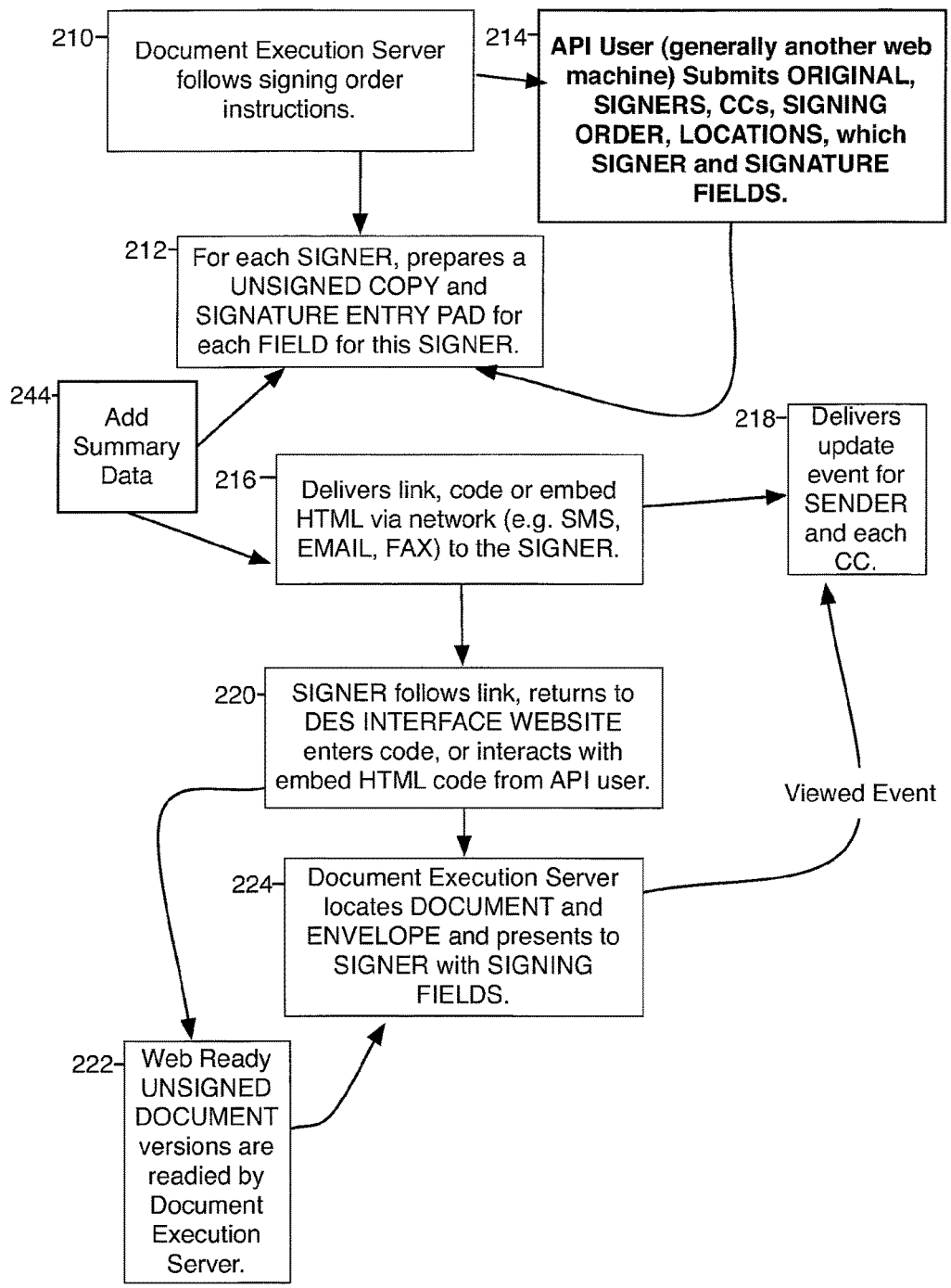
FIG. 6 is a flowchart of an embodiment of the present method.

In an alternative embodiment, as shown in FIG. 6, the document execution serve may, prior to or contemporaneous with delivering 216 the unsigned electronic document to the signer user, modify 244 the unsigned electronic document to include summary data associated with the document to assist signer users identify the locations of signature fields in the electronic document. Such summary data may be presented as a summary in a side menu to the document, may appear visually on the same page as a signature field, or may be presented anywhere on the visual periphery of document pages. It may include indicators such as the total number of signature fields in the subject document, the number of signature fields that have been completed, the number of signature fields remaining to be completed, or any combination of such data. The summary data may be presented graphically as a bar, as buttons, as text, as color indicators (e.g., red for incomplete signature fields; green for completed signature fields), and the like. The summary data may be static, by presenting location identification data (e.g., page, paragraph information) associated with each signature field, or by presenting the total number of signature fields contained in the subject document. Alternatively, the summary data may be dynamic, changing as the signer user completes each signature field.

Figure 7A:
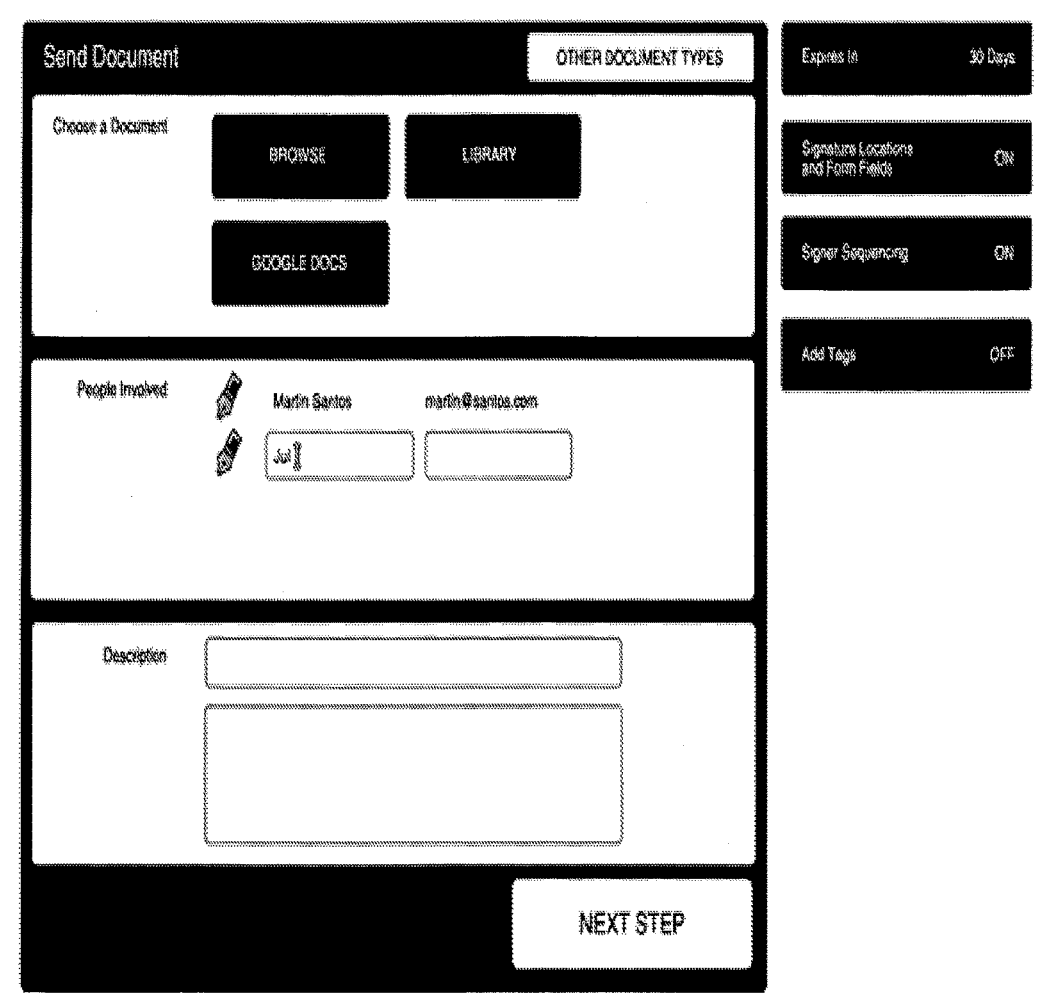
Figure 7B:
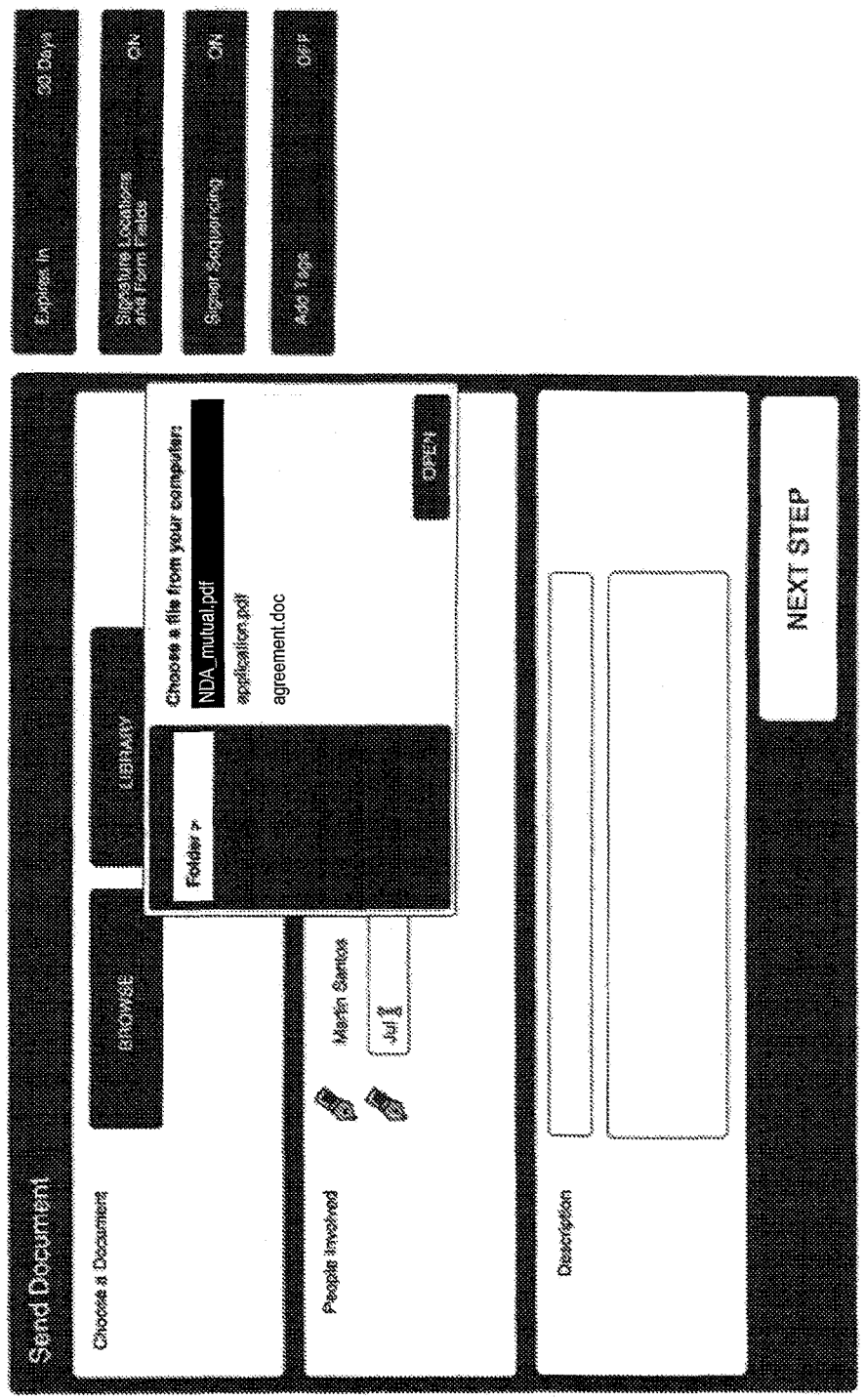
FIGS. 7A-7M are screenshots of a computer performing the present method.

Turning now to FIGS. 7A - 7M, this series of screen shots shows an exemplary embodiment of the present system and method. FIG. 7A shows a start-up / home screen for a website using the present system and method. Note that the sender user is prompted to "Choose a Document", name the "People Involved", (aka signer users), and enter a document "Description." In FIG. 7B, the sender user viewing this screen selects an "NDA mutual.pdf" document from a selection of available template documents. The document sender may also import a self-generated document, or select a document from another source, as available.

Figure 7C:
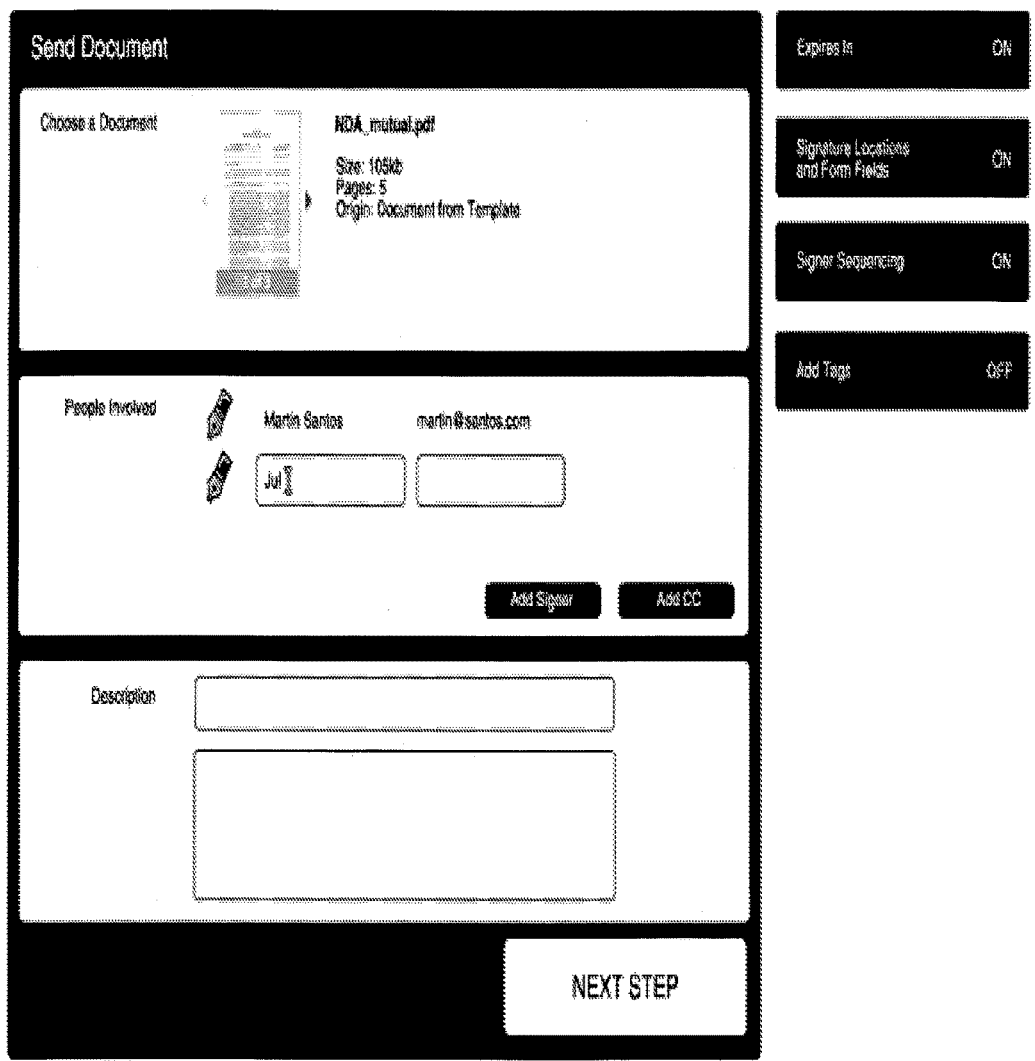

FIG. 7C shows that a signer user has been selected, "Martin Santos," having an associated email address. The document sender may select from a library of contacts stored in association with the document sender's account information at the website, may manually enter the signer user contact information, or may otherwise import the information from a source. Note that to the right of the screen, the document sender has the option of associating an expiration date with the selected document. This expiration date is that date on which a signer user no longer can complete the signature fields of a received unsigned document. In addition, to the right of the screen is a counter indicating the number of signature locations and form fields that occur in the subject document. It also allows the document sender to include flags, or "tags" in the subject document.

Figure 7D:
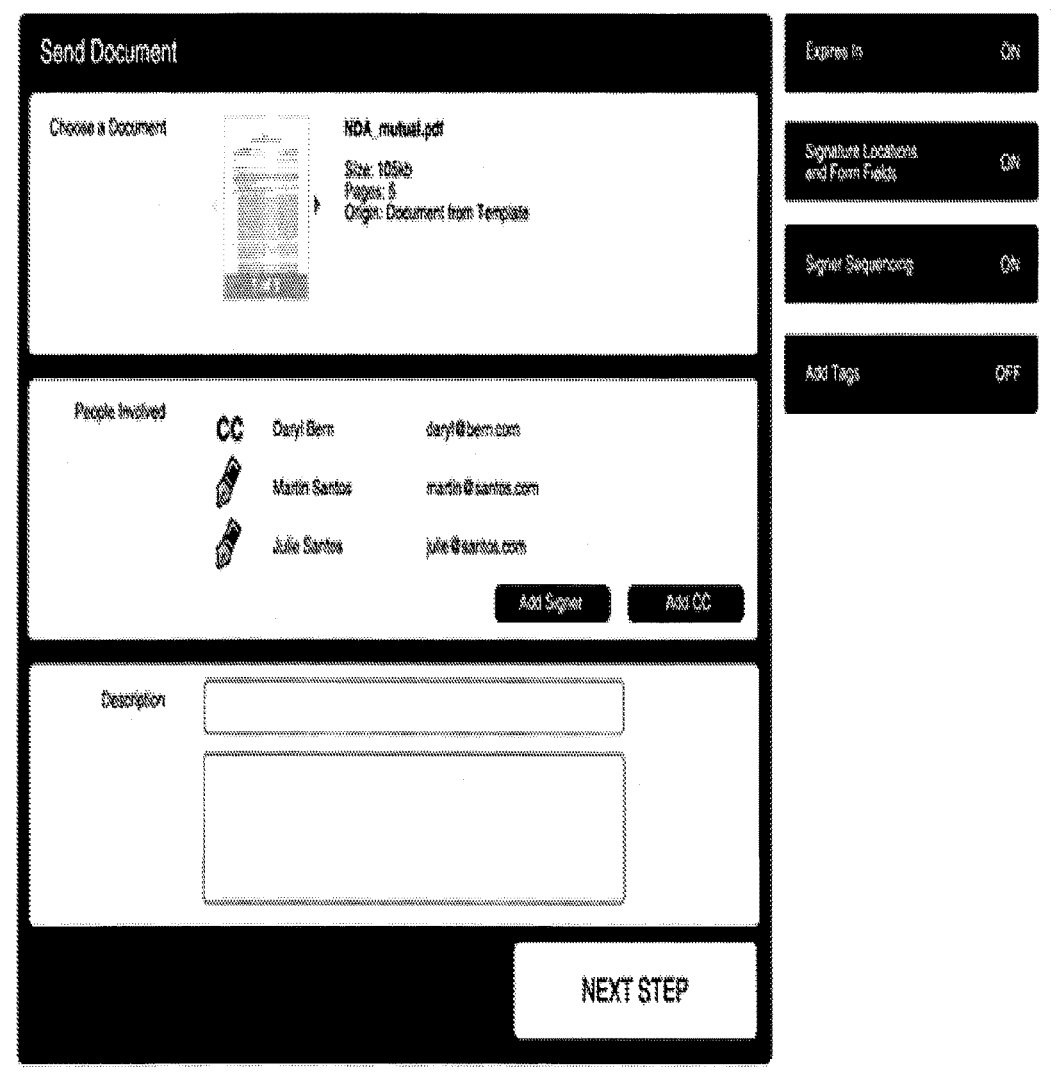
Figure 7E:
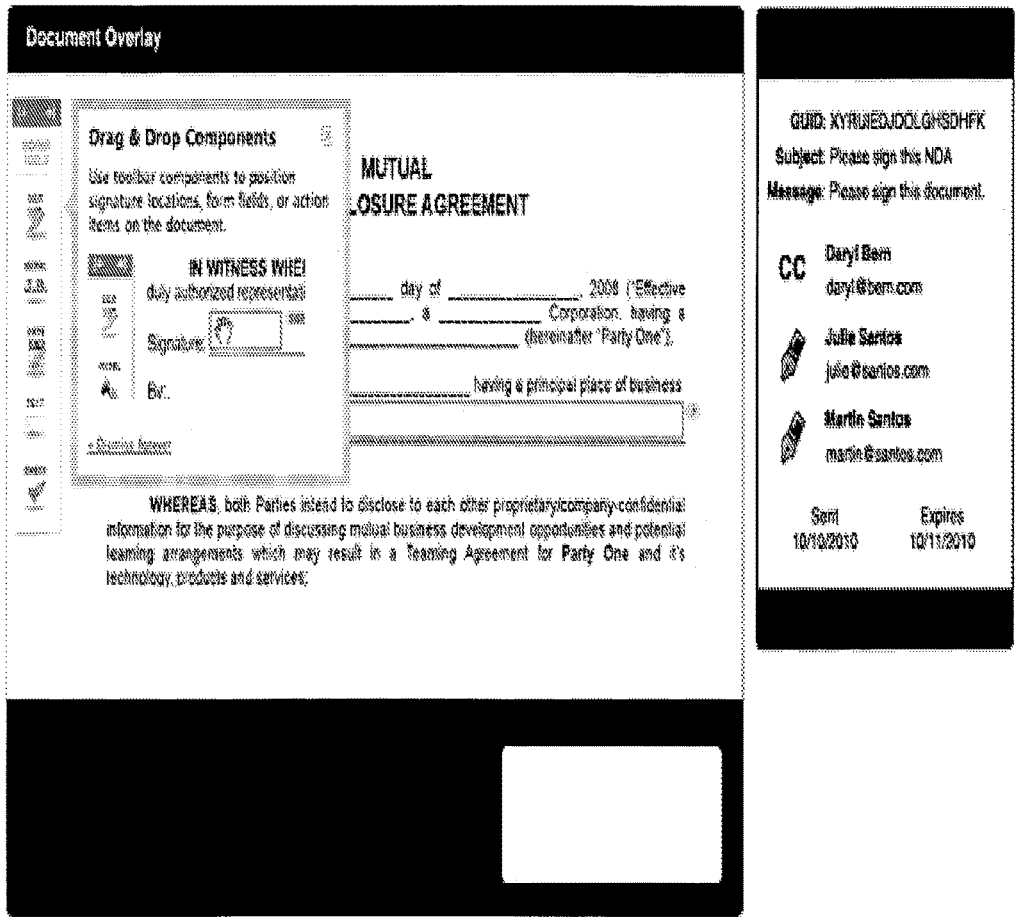
Figure 7F:
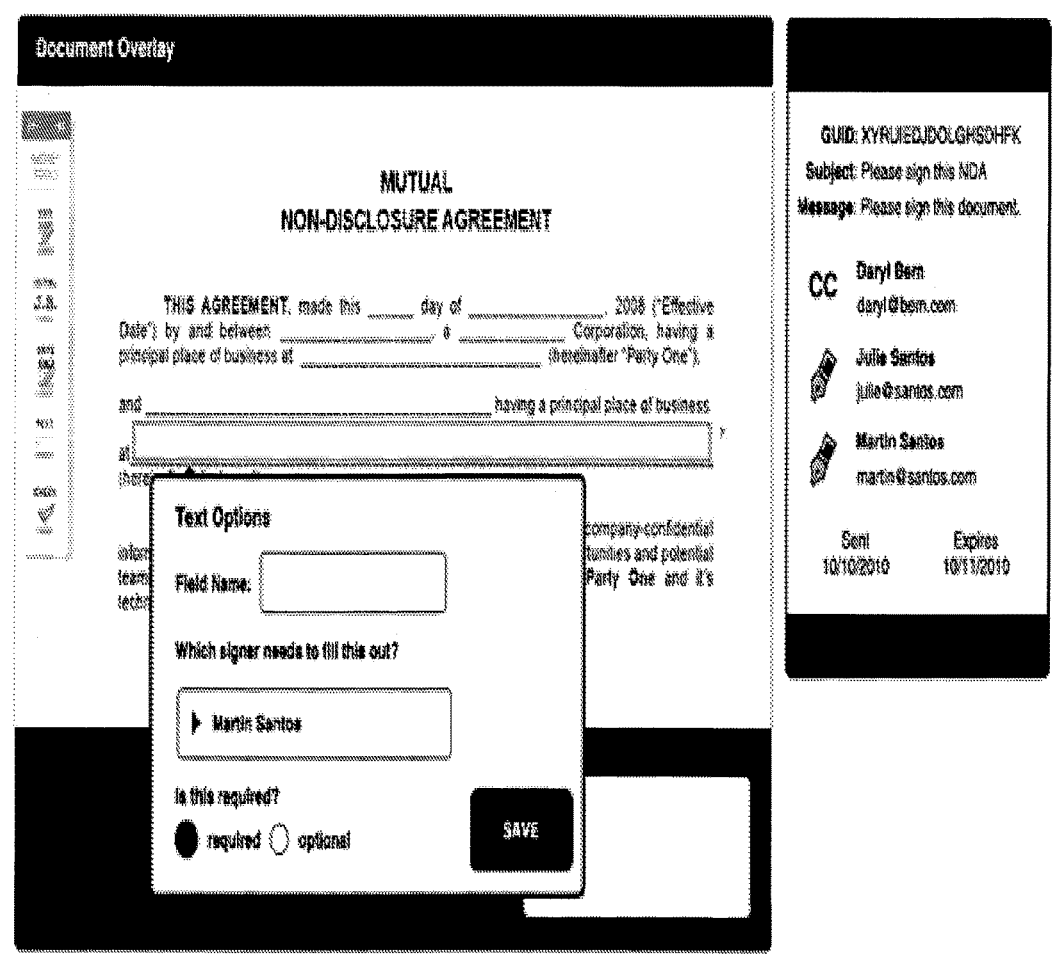
Figure 7G:
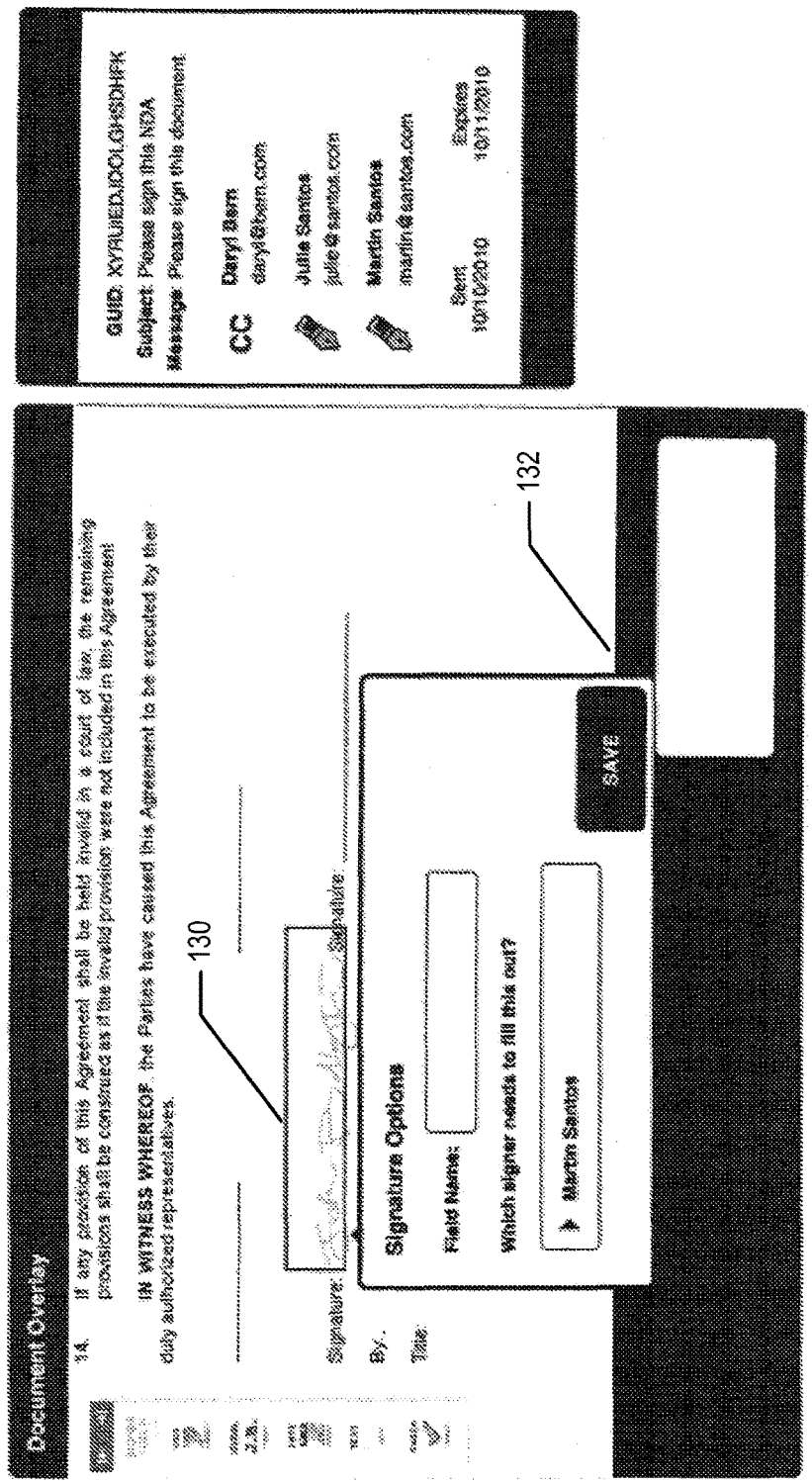
Figure 7H:
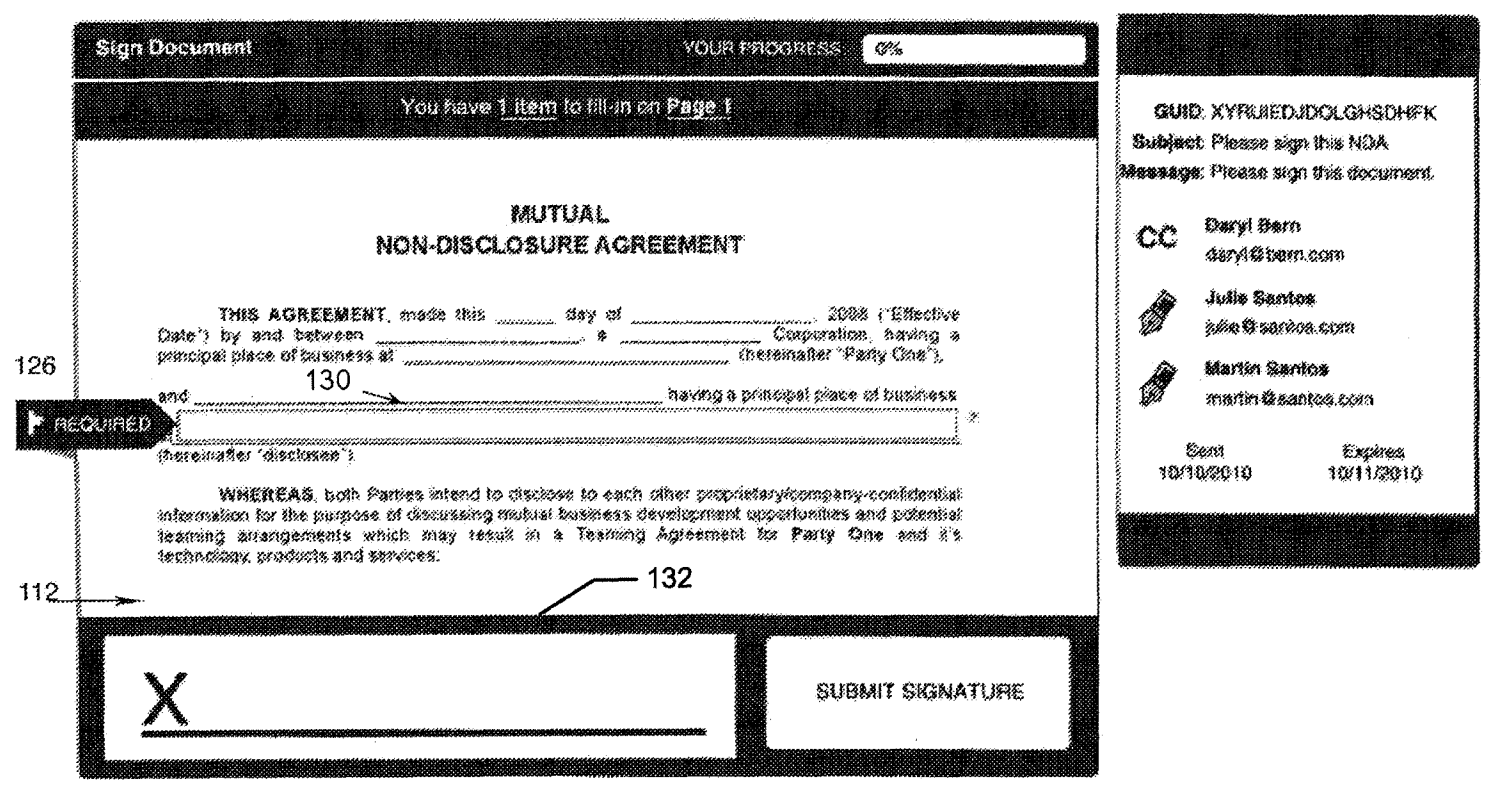
Figure 7T:
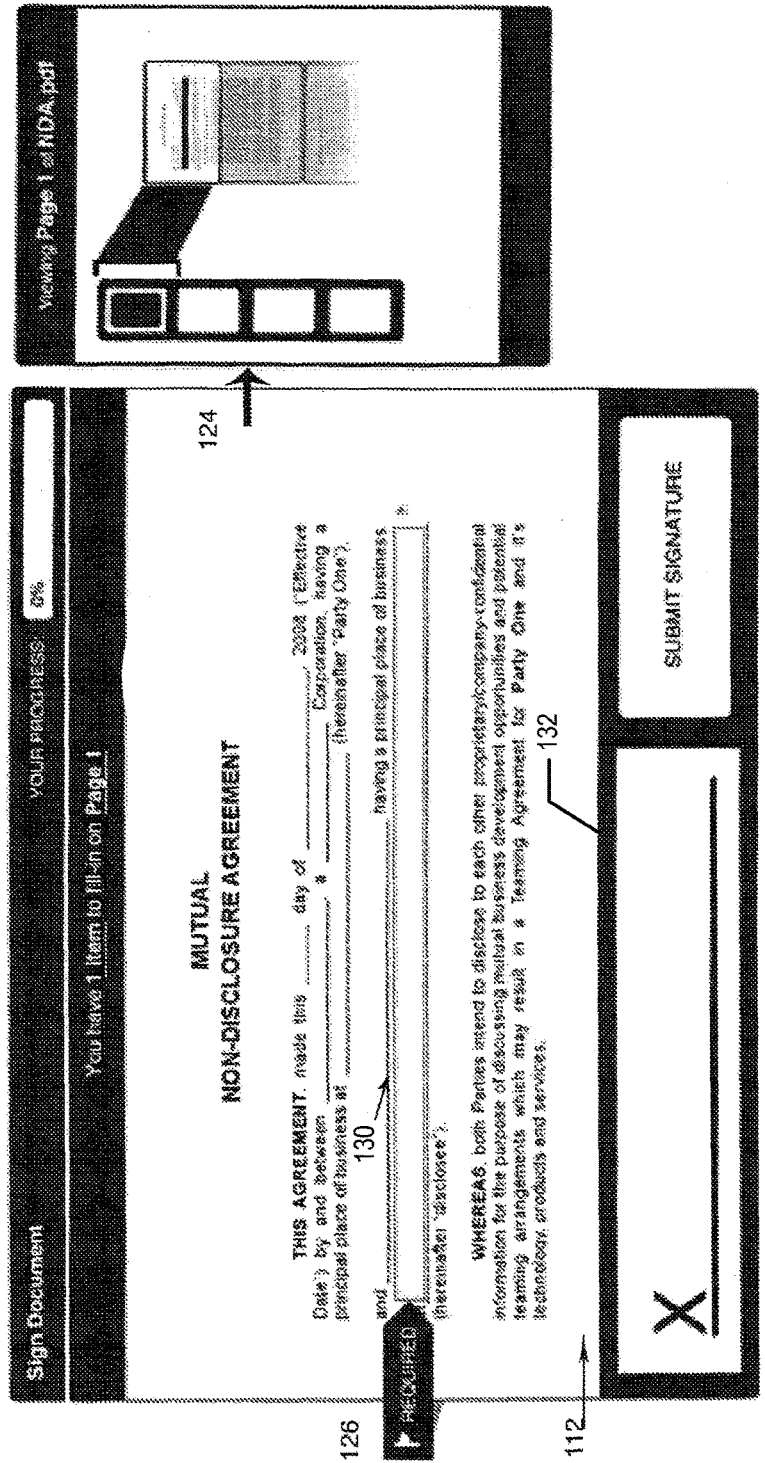

FIG. 7D shows a screen in which the document sender selected two signer users ("Martin Santos" and "Julie Santos"), and also selected a non-signer user to receive a copy of the document, including the signed document ("cc" "Daryl Bern"). FIG. 7E shows a document sender selecting a signature entry pad as a document overlay to insert in a signature field in the electronic document. FIG. 7F shows the screen that allows the document sender to identify which signer user is associated with which signature field. The screen allows the document sender to indicate whether a signature is required or optional, and associates a name with a given signature field for easily inserting the signature field in multiple locations in the document. FIG. 7G shows the signature entry pad 132 associated with the signature field identified in the previous screen, located at the desired location within the document.

Figure 7J:
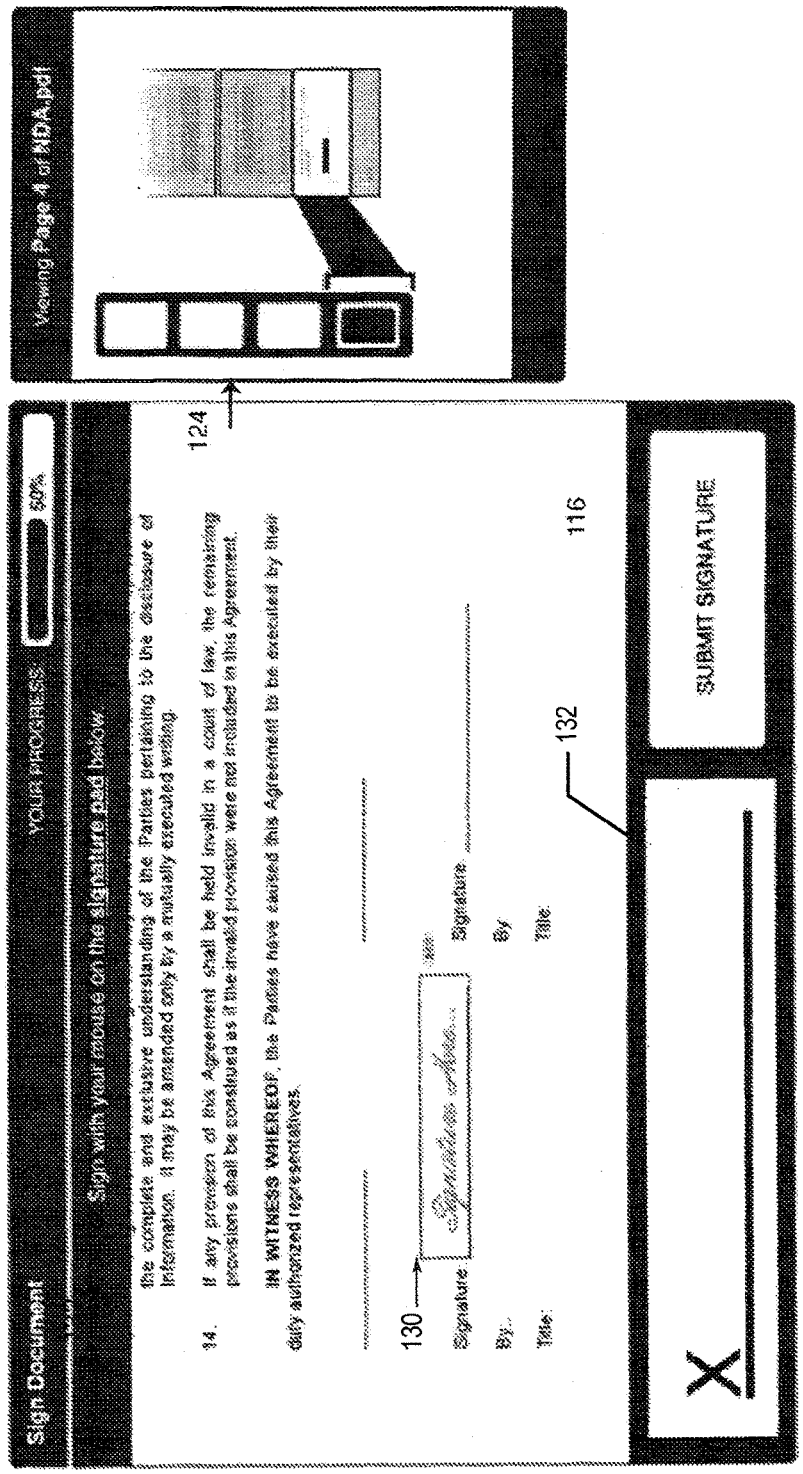
Figure 7K:
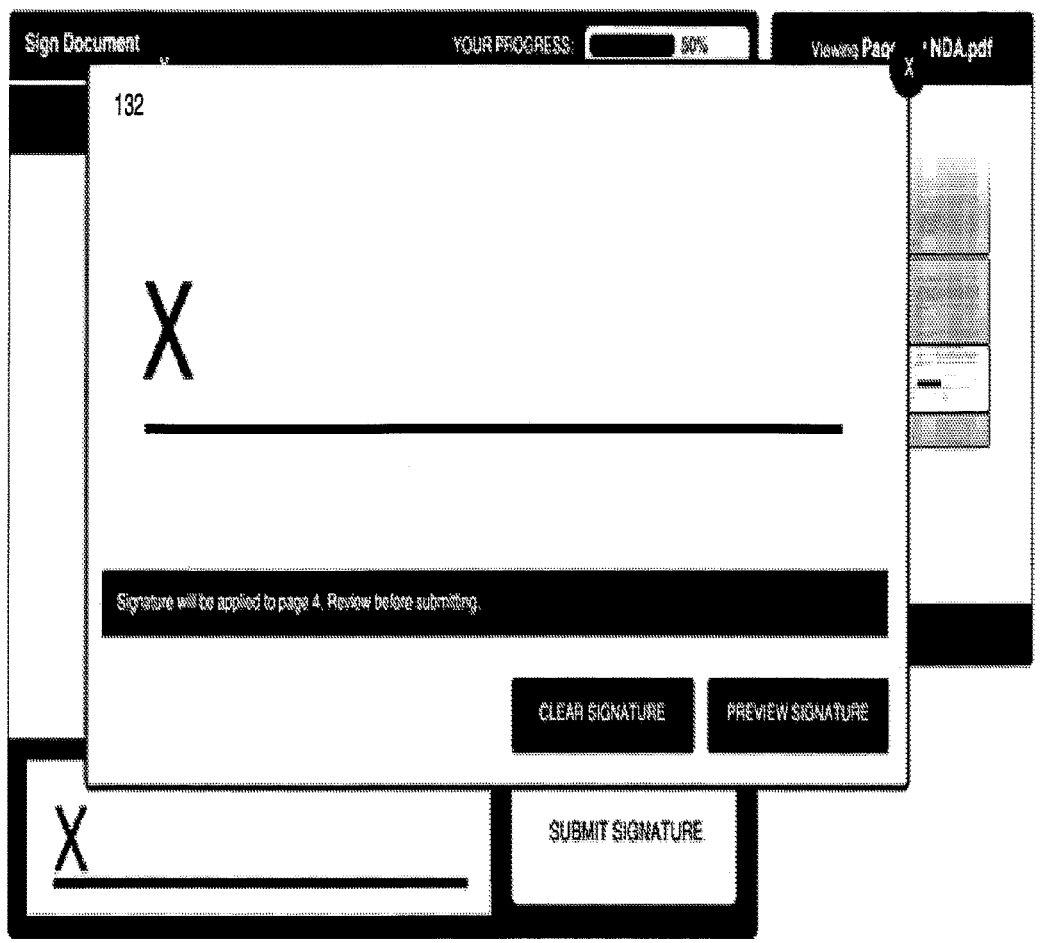
Figure 7L:
Figure 7M:
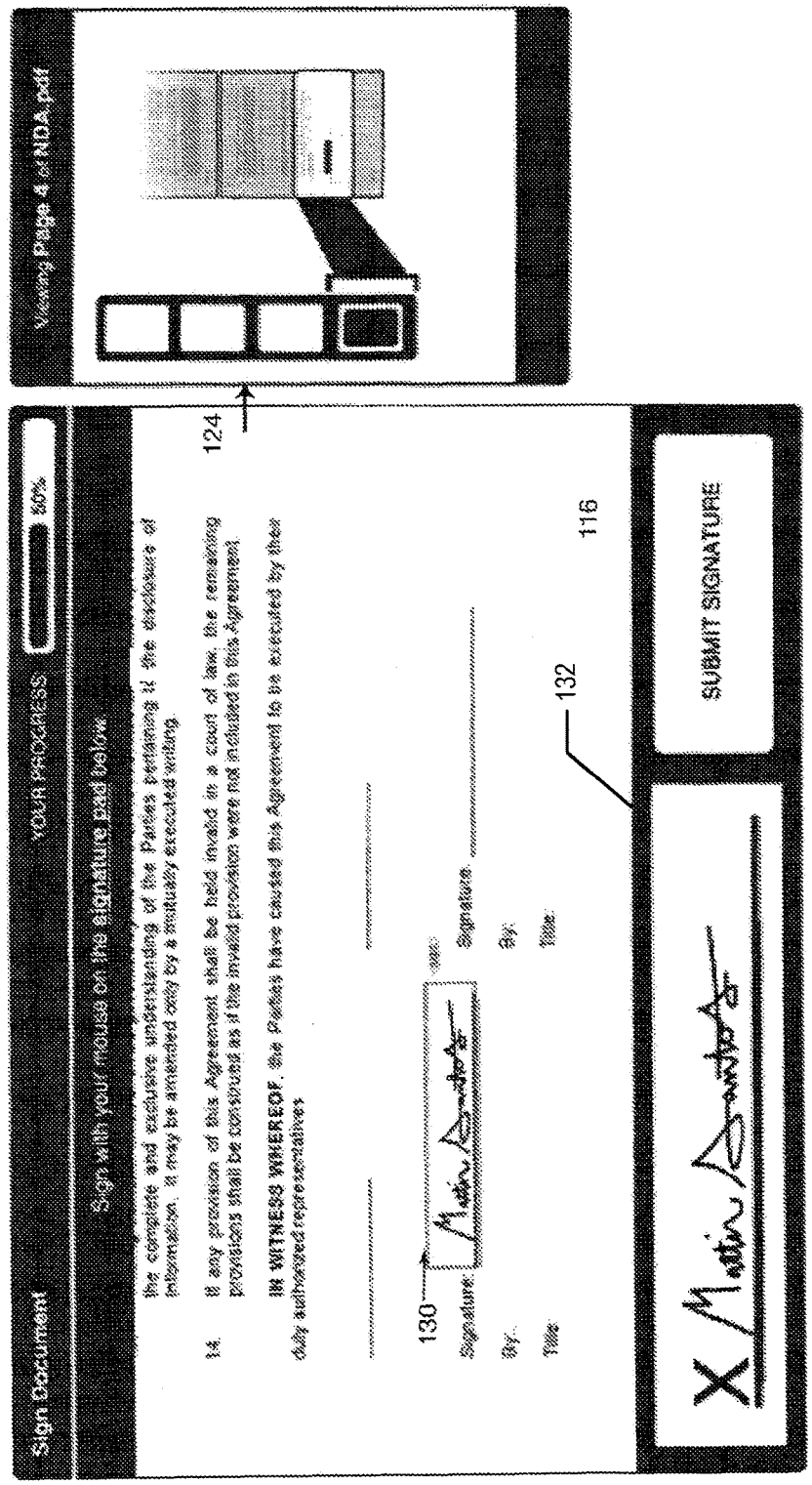

FIG. 7H shows a screen having a flag to the left of a signature field 130 to be completed by a designated signer user, and summary text appearing at the top of the screen, indicating the number of signature fields to be completed in the document. At this point, the screen still is being viewed by the document sender as the unsigned electronic document is being generated. The above steps are repeated iteratively until all desired signature fields and associated signature entry pads are defined and placed throughout the document. FIG. 7I shows a visual summary data indicator that indicates certain information to the screen viewer about the subject document. The visual may be in the form of a "thermometer-type" bar indicator (as shown), or any other visual quantitative indicator. FIG. 7J shows how the signature field 130 and associated signature entry pad 132 appears to the signer user once the unsigned electronic document is completed and sent to the signer user. FIG. 7K is a close-up view of the associated signature entry pad 132, as shown in FIG. 7J. FIG. 7L shows the same signature entry pad 132 with a signature included from a signer user. FIG. 7M shows a document with a signature in the signature field 130, prior to the signed document being submitted to the document execution server.

Although these screen shots show one implementation of the present method and system, there are many variations on the specific systems used, software programs and languages used, and layout and design used in implementing the present method and system within the scope of the claims.

The various methods described above may be embodied in, and fully automated by, software code modules executed by one or more general purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data.

As will be appreciated, various combinations of the features and methods described herein may be incorporated into a given system according to the invention. Accordingly, all combinations of the disclosed features and methods fall within the scope of this disclosure.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What we claim is:

1. A method for enabling electronic signing of an unsigned electronic document over a network, wherein the unsigned electronic document includes content displayable to one or more signer users as text and/or graphics on one or more pages, and one or more signature fields at one or more locations on the pages, wherein the signature fields are adapted to receive a signature of one of said signer users, comprising the steps of:
   (a) receiving over the network the unsigned electronic document from a document sender via a document execution server together with signer party data representative of the identities of one or more signer users who are to sign the unsigned electronic document, (b) making available the unsigned electronic document to all signer users over the network via said document execution server together with a dynamic online signature entry pad associated with each signature field in the unsigned electronic document, said dynamic online signature entry pad also made available over the network via said document execution server, (c) receiving signature data over the network from one or more of the signer users via said document execution server, the signature data representative of one or more biometric actions by the respective signer users corresponding to entry of signer user signatures to the dynamic signature entry pads associated with the respective signature fields of the unsigned electronic document, and (d) generating a signed electronic document corresponding to the unsigned electronic document in response to receipt of the signature data from one or more of the signer users, wherein the signed electronic document includes information representative of the signatures of the signer users, and wherein the signed electronic document is displayable to signer users with the text and/or graphic content and signature fields of the unsigned electronic document and a graphical representation of the received signature data in the respective signature fields.

2. The method according to claim 1, comprising a further step of:
establishing the unsigned electronic document received over the network from the document execution server to be web-ready following step (a) and prior to step (b) using said document execution server.

3. The method according to claim 1 wherein the document sender is one of said signer users.

4. The method according to claim 1 wherein the document sender is other than one of said signer users.

5. The method according to claim 1 comprising further steps of:
(e) generating authentication data associated with the received signature data from the respective signer users using the document execution server, wherein the authentication data is not changeable by any party, and
(f) storing the authentication data in association with the signed electronic document using the document execution server.

6. The method according to claim 5 comprising a further step of:
(g) irreversibly coupling the authentication data with the signed electronic document using the document execution server.

7. The method according to claim 1 comprising a further step of:
sending copies of the signed electronic document to the signer users via the document execution server.

8. The method according to claim 1 comprising a further step of:
modifying the unsigned document via the document execution server before step (b) to include flag data interpretable by the respective signer users to successively identify to the respective signer users and the signature fields in the unsigned electronic document which require entry of their signature in the dynamic signature entry pads associated with each signature field in the unsigned electronic document, whereby the modified unsigned electronic document is made available to the respective signer users in step B.

9. The method according to claim 1 comprising a further step of:
generating summary data for each signer user via the document execution server in conjunction with step (b), the summary data interpretable by each signer user to identify the locations in the unsigned electronic document requiring signature by the respective signer users, and sending the summary data to the respective signer users.

10. The method according to claim 1 wherein graphical representation of the signature data received over the network in the respective signature data fields of the signed electronic document for the signer users matches the signatures of the respective signer users.

11. The method according to claim 1 wherein the signer party data representative of the identities of the signer users includes email addresses for one or more of the signer users.

12. The method according to claim 1 wherein the signer party data representative the of identities of the signer users includes SMS addresses for one or more of the signer users.

13. The method according to claim 1 wherein the signer party data representative of the identities of the signer users includes fax numbers for one or more of the signer users.

14. The method according to claim 1 wherein the signer party data representative of the identities of the signer users includes third party server addresses for one or more of the signer users.

15. The method according to claim 1 wherein at least one biometric action corresponds to a free-form signature effected by one of said signer users.

16. The method according to claim 1 wherein at least one biometric action corresponds to a retina scan effected by one of said signer users.

17. The method according to claim 1 wherein at least one biometric action corresponds to an iris scan effected by one of said signer users.

18. The method according to claim 1 wherein at least one biometric action corresponds to one or more fingerprints effected by one of said signer users.

19. The method according to claim 1 wherein the network is the Internet.

\* \* \* \* \*